April 6, 1965  B. F. B. SMITH ETAL  3,176,498
METHOD FOR TESTING PLASTIC FILM
Filed July 31, 1961  2 Sheets-Sheet 1
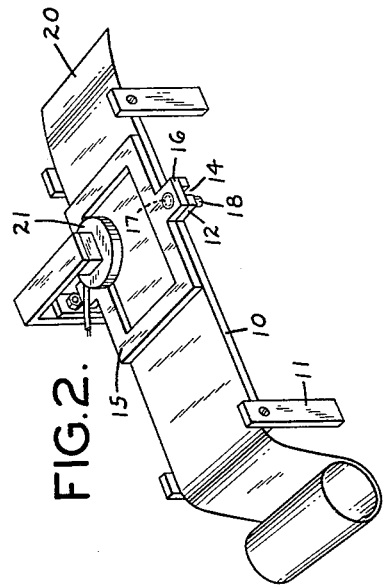
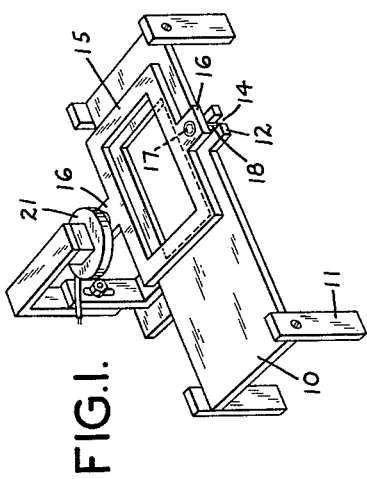
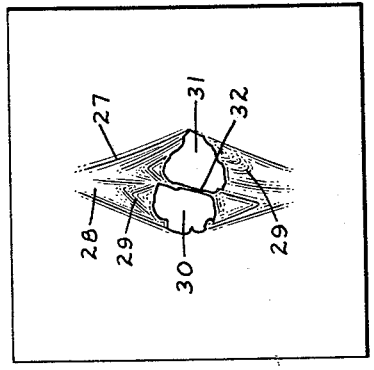
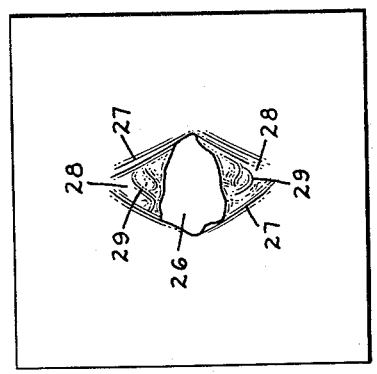
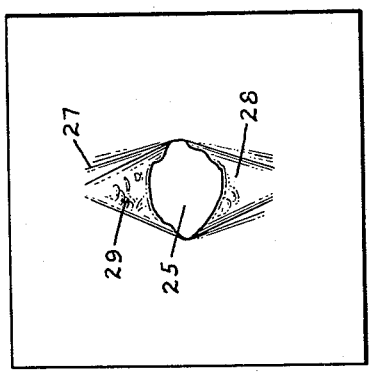
INVENTORS:
BURTON F. B. SMITH
WILLIAM L. OLMSTED, JR.
BY
ATTORNEY April 6, 1965 B. F. B. SMITH ETAL 3,176,498
METHOD FOR TESTING PLASTIC FILM
Filed July 31, 1961 2 Sheets-Sheet 2

INVENTORS:
BURTON F. B. SMITH
WILLIAM L. OLMSTED, JR.
BY
ATTORNEY

United States Patent Office 3,176,498
Patented Apr. 6, 1965

3,176,498
METHOD FOR TESTING PLASTIC FILM
Burton F. B. Smith, Madison, and William L. Olmsted, Jr., Summit, N.J., assignors to Allied Chemical Corporation, New York, N.Y., a corporation of New York
Filed July 31, 1961, Ser. No. 128,044
2 Claims. (Cl. 73—15)

This invention relates to the testing of plastic film and sheet material and more particularly to new and improved method for evaluating the performance characteristics of rigid plastic film and sheet material in high temperature applications.

Rigid or semi-rigid plastic film and sheet material is characterized by having relatively little or no plasticizing agents. Plastic film of this type is commonly used in high temperature operations such as vacuum forming in which the film is stretched or stressed under vacuum pressure to be fitted or shaped on a particular surface for various purposes. The rigid plastic films are subject to distortion and breakdown under these conditions and frequently are found unsuitable for use in such processes. In operations conducted at near-ambient temperatures the performance of such material can generally be readily predicted from standard measurements of ordinary physical properties such as tensile strength, elongation, surface hardness, dimensional stability, and the like. However, due to inability to predict accurately the performance and suitability of rigid film material in the high temperature applications a number of problems have been encountered. In practical experience films of the highest quality based on measurement of such ordinary physical properties have been found unsuitable for use at the higher temperatures. Efforts made in the past to correlate the ordinary physical properties of rigid plastic film with performance at high temperatures have resulted in methods which have been cumbersome, time-consuming and unreliable. The disadvantages attendant the absence of a reliable method of predicting high temperature performance of film material are obvious. For example, poor film which breaks down during vacuum forming will cause shut-down of the operation resulting in considerable "down time" and high production costs. Other additional costs are incurred in the shipment and return of poor film.

A major object of the present invention is to provide a simple expeditious method for evaluating the performance characteristics of rigid or semi-rigid plastic film material in high temperature applications such as vacuum forming. Other objects and advantages will be evident from the following description of the invention.

In the course of our experimentation with plastic film of the rigid or semi-rigid type in an effort to develop methods of evaluating the character and performance of the film at elevated temperature we noted that internal stresses introduced into the film during manufacture and of minor consequence at near-ambient temperatures were of primary importance in determining the behavior characteristics of the film at elevated temperatures. We have discovered that it was unnecessary to take physical measurements of tensile stresses and other physical properties of film in order to determine suitability for high temperature vacuum forming, but that suitability of the film could be ascertained rapidly by a simple economical procedure involving the application of heat under specified temperature and time control conditions to evaluate internal stresses in the film as hereinafter described.

It has been found in accordance with the invention that rigid plastic film may be effectively tested to determine suitability of the film in high temperature applications such as vacuum forming by suspending a specimen of rigid plastic film as between a pair of suitable frame members to expose an unsupported substantially planar surface area of the specimen, subjecting said unsupported exposed surface area to constant and intense radiant heat to raise the film to the flow-point temperature in less than about one minute, preferably in 2–15 seconds, to rapidly relieve internal stresses present in the film, and thereafter continuing said heating of the exposed film to determine whether the exposed film surface withstood rupture or perforation for a period of at least about 5–8 seconds after the flowpoint temperature is reached. Poor film which has critically large internal stresses has been found to rupture, lace or pinhole almost immediately on reaching the flow-point temperature due to the rapid release of these stresses. This will take place in as little as 1 to 3 seconds, generally not more than about 5–8 seconds. Film suitable for use at high temperatures will generally withstand the rapid release of internal stresses for a period of at least about 8 seconds or more without rupture or perforation. The higher quality rigid films from the high temperature standpoint will generally withstand the test conditions for about 1 to 2 minutes or more. It will be noted that in the present invention it is unnecessary to determine physical properties or to measure stress forces of the film as indeed such data has been found unsatisfactory in determining suitability of the film.

The test procedure provides a simple and effective method for accurately predicting the suitability of thin rigid plastic films in applications such as vacuum forming in which film temperatures are raised above about 150° F. In applications in which the film surface temperature is below about 150° F. the internal film stresses do not appear to be an important factor influencing the performance of the rigid films.

The invention will be further described in detail with reference to the accompanying drawings in which:

FIG. 1 is a perspective view showing preferred apparatus for carrying out the present invention.

FIG. 2 is a perspective view showing assembly of plastic film specimen for testing in the apparatus shown in FIG. 1.

FIGS. 3–8 are illustrative sketches based on actual photographs showing typical results obtained on testing of plastic films which are not suitable for use in high temperature applications.

Figure 8:
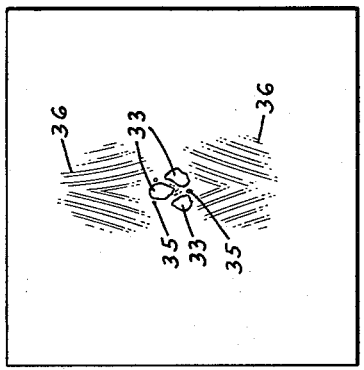

Referring to FIG. 1, preferred apparatus for conducting the test in accordance with the invention includes a base frame 10 supported on legs 11 and having slotted flanges 12 on opposite sides of the frame adjacent the frame opening. Legs 11 extend slightly above the plane of base frame 10 to position the plastic film specimen against horizontal movement, as shown in FIG. 2. Base frame 10 is typically 18 inches in length and 7 inches in width with a 6 x 6 inch frame opening. Flanges 12 extend about 1 inch from the edge of frame 10 and have a width of about 1 inch. Slots 14 extend about ¾ inch in from the edge of flanges 12 and have a width of 5/16 inch. Upper frame 15 is 7 x 7 inches with a 6 x 6 inch frame opening and has flanges 16 which correspond dimensionally to flanges 12 of the base frame 10. Flanges 16 have openings 17 fitted with pins 18 which cooperate with slots 14 to align the upper and base frame openings vertically and facilitate raising and lowering of upper frame 15 along the path of vertical alignment when positioning the film specimen between the frames.

As shown particularly in FIG. 2, the plastic film specimen 20 is placed on base frame 10 over the frame opening. The film specimen may be any of the thermoplastic films of the rigid or semi-rigid type such as vinyl film. Examples of film which may be tested by the method of the invention include polyvinyl chloride, polyethylene, polypropylene and polyvinyl acetate. Upper frame 15 is then lowered to secure and expose a substantially planar surface area of the specimen 20. Frames 10 and 15 preferably secure the entire peripheral portion of the specimen. For apparatus of the dimensions described the test specimen is desirably 7 inches in width and length exposing a 6 x 6 inch film area. Film specimens of length corresponding to the width of the roll from which they are taken may be easily and efficiently tested by simply raising the upper frame and drawing the next section of the film into position for testing. Such testing is usually desirable as plastic film has been found variable with respect to the desired properties across the width of the film roll. As shown in FIG. 2, the vertically extended portion of legs 14 may be used to guide the strip between the frames.

When the specimen has been secured between the frames the assembly is positioned beneath a radiant heater 21 which is centered over the exposed film area. Heater 21 may be a suitable source of radiant heat adapted to supply intense radiant heat to raise the temperature of the film rapidly. For example, a resistance wire embedded in a ceramic facing of about 3 inches diameter has been found to be suitable. As the film temperature reaches the flow-point the internal stresses in the film are relieved and rupture of the film surface may occur, depending upon the degree to which such internal stresses are present in the film. A convenient method of determining the time at which the flow-point temperature is reached is by observing when the film surface takes on the glossy appearance of liquid material. The film also appears to wrinkle and then smooth just prior to the flow-point temperature. The end-point of the test is the first appearance of perforation or rupture of the film surface. Once the film ruptures the opening enlarges rapidly toward a maximum, generally in 1 or 2 seconds. Thus, the end-point may be observed with a good degree of accuracy. Timing of the test from the flow-point temperature to end-point may be recorded using any conventional device such as a stop watch. Films into which large, critically defective internal stresses have been introduced will rupture almost immediately when the flow-point temperature is reached, generally in about ¼ to 3 seconds. Rigid films of this type have been found unsuitable in high temperature applications such as vacuum forming. Rigid films having moderate amounts of internal stresses which may be tolerated in high temperature operations will not rupture immediately but will withstand intense heating at the flow-point temperature for greater than 8 seconds time. Films having minor amounts of internal stresses will generally deform slowly over the heating period and withstand rupture or perforation for as much as 1 to 2 minutes or more. In carrying out the test of rigid film in accordance with the invention it is important that the film specimen be subject to intense radiant heat to raise the film temperature rapidly to the flow-point temperature. Heating time to the flow-point temperature is preferably less than one minute and most desirably less than 10 seconds. Extended heating times tend to effect conditioning of the film and give unreliable results. It is therefore desirable to bring the heater to a constant heating temperature before placing the exposed surface of the film in position. Rapid heating of the film specimen is suitably accomplished by placing the specimen only so far from the heater as necessary to prevent decomposition of the specimen. For apparatus of the capacity and dimensions indicated distances between the heater and film surface may be as little as ½ inch, usually within the range of about 1 to 3 inches. Generally, the finer gauge films require the upper range distances. For example, a distance of about 1½ to 2 inches has been found suitable for 2 mil film. Good results are obtained for films up to about 8 mils in thickness. Above this limit other factors in addition to internal stresses may cause less accurate test results.

During testing of rigid film by the method of the invention it is important that the exposed area of the film be suspended and not allowed to contact other surfaces, i.e., the exposed test surface area of the film is suspended in free space and supported only at the edges of said surface area. Contact of the specimen surface in such a manner apparently interferes with stress release at the flow-point temperature and adversely affects the reliability of test results. The specimen is not stressed or stretched during testing and should be smooth or substantially planar to prevent adverse variations due to uneven heating or creasing of the surface area.

Figure 11:
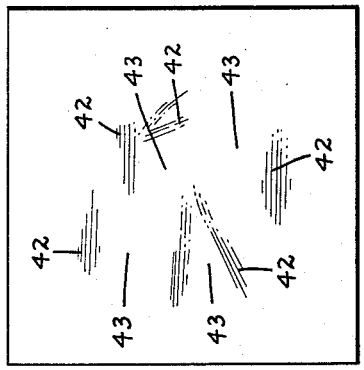
FIGS. 9–11 are illustrative sketches based on actual photographs showing typical results obtained on testing of films which are found suitable for use in high temperature applications.
Figure 7:
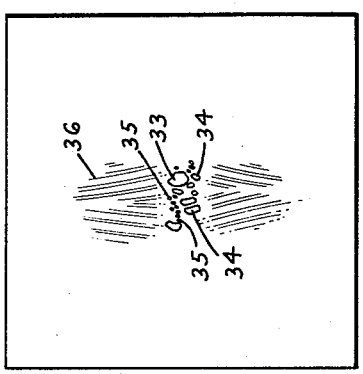
Figure 10:
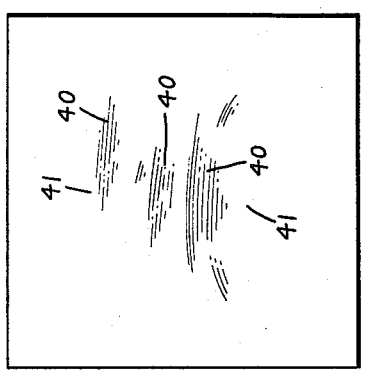
Figure 6:
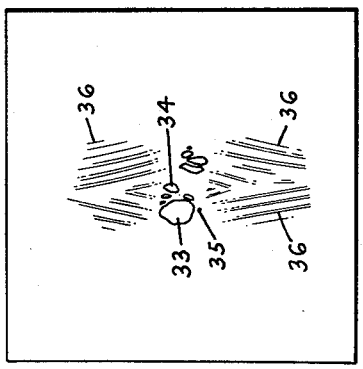
Figure 9:
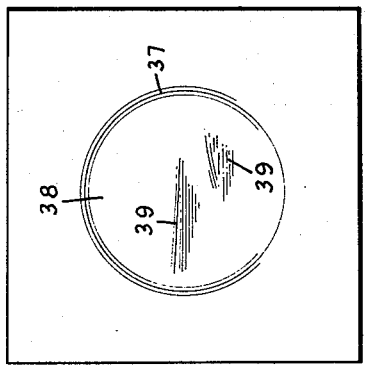

Results obtained may differ considerably due to variations in the amount and patterning of the internal stresses present in the film. In the drawings, FIGS. 3–11 illustrate various typical results obtainable on the testing of rigid film by the method of the invention. Each of three groups represented by FIGS. 3–5, FIGS. 6–8, and FIGS. 9–11 shows actual results on testing of different portions of the same film strip. It will be noted that some variations may occur within the same film strip which may be caused by differences along the length of calendering rolls used in manufacture of the film. It is therefore desirable in evaluating the film to test a number of sections of the film strip which have been cut across the width of the film roll. In FIGS. 3 and 4, relatively large openings 25 and 26 appear in the 6 x 6 inch test area outlined as shown. Rapid release of the internal stresses also causes formation of creases 27, depressions 28 and ridges 29. FIG. 5 illustrates another typical pattern in which two relatively large openings 30 and 31 are separated by a narrow strip of film 32. Creases 27, depressions 28 and ridges 29 are similarly associated with the openings in the film. The relatively large holes are found to appear rapidly with the poorer films, usually within 1–2 seconds after the flow-point temperature. FIGS. 6–8 illustrate somewhat different test pattern obtained after 3 to 5 seconds with film found unsuitable for use at high temperatures. As shown, a plurality of different size openings appear in the film. Larger holes 33 are associated in a lacing pattern with relatively smaller openings 34. Openings 35 approximating the size of pinholes also occur. Creases or wrinkles 36 extend in more or less the machine direction across the width of the film specimen. FIGS. 9–11 illustrate results obtained on testing of film found suitable for use in high temperature applications. Each of the specimens shown remained unruptured for better than one minute after the flow-point temperature was reached. FIG. 9 shows the outline 37 of a substantially circular depressed portion 38 caused by flow of the film material within the area of maximum heat concentration. Small creases 39 appear within the depressed portion 38. The specimen of FIG. 10 shows raised areas 40 running in the machine direction combined with similarly orientated depressed areas 41 to form a rolling pattern. FIG. 11 shows another representative pattern in which raised areas 42 combine with depressions 43 in more random distribution. The results shown by FIGS. 3–11 are given for the purposes of illustration only.

While the method for determining suitability in high temperature applications such as vacuum forming is conducted on a "go or no go" basis, it is essentially quantitative in character inasmuch as the amount of internal stress in the film is related to the time during which the film retains its integrity at the flow-point temperature. Thus, the longer the film withstands rupturing at the flow-point temperature the more tolerable the amount of stress present in the film. Methods may therefore be adapted to yield significant information on film structure and for use in other important testing applications. For example, the method may be applied during film manufacture to determine the correct calendering conditions or variations in such conditions across the width of the calender roll section. The latter may be readily accomplished by taking a sample strip of film across the width of the film roll and testing individual portions of the film to note variations in the time during which the film withstands rupture at the flow-point temperature. In cases where film withstands the test conditions for about 1 to 2 minutes without rupturing deviations in film stress and calendering conditions may be noted by the amount of deformation of the film surface, the greater amounts of surface deformation being generally indicative of the larger amounts of internal film stresses. In this manner deviations of the calendering conditions such as roll temperature and thickness between the rolls may be readily discovered and corrected.

The following examples illustrate the practice of the present invention in evaluating the performance of plastic film in high temperature applications.

EXAMPLE 1

The apparatus employed in this test is similar to the apparatus illustrated in the drawings and described herein. The heater is a Chromolox Model HSP 30X24 heating element. The heater rating is 450 watts at 118 volts. Electric current to the heater is controllable through General Radio Co. "Variac" autotransformer. A Phaeostron "555" voltmeter is connected across the heating coil terminals to measure voltage. A 7 inch x 44 inch strip specimen "A" is cut across the width of rigid plastic sheet from roll of 2 mil rigid polyvinyl chloride film. The end of the plastic strip is placed on the base frame and the upper frame lowered to secure and expose a substantially planar 6 x 6 inch test specimen, designated for convenience as A-1. The radiant heater is brought to constant temperature with the transformer dial set to provide 110 volts. The test specimen is centered 1½ inches beneath the heater and timing commenced using a stop watch. The film heats rapidly and after about 3–4 seconds takes on the glossy appearance of liquid material indicating the flow-point temperature has been reached. At the flow-point the exposed film surface attains a temperature of about 325° F. as determined by heat sensitive lacquers. The film is observed to wrinkle and then smooth just prior to reaching of the flow-point temperature. The film specimen is maintained under close observation and the time to rupture of the film surface recorded. The test procedure is then repeated for two additional portions of the film strip by moving the strip a distance of about 8 inches between the frames to expose successively test specimens which are designated for convenience as A-2 and A-3. Results are summarized below in Table I.

*Table I*

| Specimen | Distance Heater to Film Surface, inches | Time to Flow-Point Temp., seconds | Total Time to Rupture, seconds |
| --- | --- | --- | --- |
| A-1 | 1½ | 3½ | 3.7 |
| A-2 | 1½ | 3½ | 4.1 |
| A-3 | 1½ | 3½ | 3.9 |

The roll of rigid plastic film from which test strip "A" was obtained is then set up for use on a vacuum former and found to break down when drawn at high temperature during the vacuum forming cycle.

EXAMPLE 2

The apparatus is the same as in Example 1. A 7 inch x 44 inch strip specimen "B" is cut across the width of rigid plastic sheet from roll of 2 mil rigid polyvinyl chloride film. The end of the plastic strip is placed on the base frame and the upper frame lowered to secure and expose a substantially planar 6 x 6 inch test specimen, designated for convenience as B-1. The radiant heater is brought to a constant temperature with the transformer dial set to provide 110 volts. The test specimen is centered 1½ inches beneath the heater and timing commenced using a stop watch. The film heats rapidly and after about 3–4 seconds takes on the glossy appearance of liquid material indicating the flow-point temperature has been reached. At the flow-point the exposed film surface has a temperature of about 325° F. as determined by heat sensitive lacquers. The film is observed to wrinkle and then smooth just prior to reaching of the flow-point temperature. The film specimen is maintained under close observation and the time to rupture of the film surface recorded. The test procedure is then repeated for two additional portions of the film strip by moving the strip a distance of about 8 inches between the frames to expose successively test specimens which are designated for convenience as B-2 and B-3. Results are summarized below in Table II.

*Table II*

| Specimen | Distance Heater to Film Surface, inches | Time to Flow-Point Temp., seconds | Total Time to Rupture, seconds |
| --- | --- | --- | --- |
| B-1 | 1½ | 3½ | 4.9 |
| B-2 | 1½ | 3½ | 10.3 |
| B-3 | 1½ | 3½ | 4.2 |

The roll of rigid plastic film from which test strip "B" was obtained is then set up for use on a vacuum former and found to break down when drawn at high temperature during the vacuum forming cycle.

EXAMPLE 3

The apparatus is the same as in Example 1. A 7 inch x 44 inch strip specimen "C" is cut across the width of rigid plastic sheet from roll of 2 mil rigid polyvinyl chloride film. The end of the plastic strip is placed on the base frame and the upper frame lowered to secure and expose a substantially planar 6 x 6 inch test specimen, designated for convenience as C-1. The radiant heater is brought to a constant temperature with the transformer dial set to provide 110 volts. The test specimen is centered 1½ inches beneath the heater and timing commenced using a stop watch. The film heats rapidly and after about 3–4 seconds takes on the glossy appearance of liquid material indicating the flow-point temperature has been reached. At the flow-point the exposed film surface has a temperature of about 325° F. as determined by heat sensitive lacquer. The film is observed to wrinkle and then smooth just prior to reaching of the flow-point temperature. The film specimen is maintained under close observation and the time to rupture of the film surface recorded. The test procedure is then repeated for two additional portions of the film strip by moving the strip a distance of about 8 inches between the frames to expose successively test specimens which are designated for convenience as C-2 and C-3. Results are summarized below in Table III.

*Table III*

| Specimen | Distance Heater to Film Surface, inches | Time to Flow-Point Temp., seconds | Total Time to Rupture, seconds |
| --- | --- | --- | --- |
| C-1 | 1½ | 3½ | 12.2 |
| C-2 | 1½ | 3½ | 15.0 |
| C-3 | 1½ | 3½ | 14.6 |

The roll of rigid plastic film from which test strip "C" was obtained is then set up for use on a vacuum former and found to perform satisfactorily when drawn at high temperature during the vacuum forming cycle.

Although certain preferred embodiments of the invention have been disclosed for purpose of illustration, it will be evident that various changes and modifications may be made therein without departing from the scope and spirit of the invention.

We claim:

1. The method of testing rigid plastic film up to 8 mils in thickness to determine suitability of the rigid plastic film in vacuum forming operations which comprises suspending a specimen of rigid plastic film to provide an exposed untensioned planar surface area disposed in free space and supported only at the edges of said surface area, subjecting said unsupported exposed surface area of the specimen to intense radiant heat to raise the temperature of the film to the flow-point in less than about one minute to relieve internal stresses present in the film rapidly, and thereafter continuing said heating of the exposed film to determine whether the film specimen withstands perforation for a period of at least about 5-8 seconds after the flow-point temperature is reached.

2. The method of claim 1 in which the rigid plastic film is polyvinyl chloride.

References Cited in the file of this patent

UNITED STATES PATENTS

| | | |
|---|---|---|
| 2,895,327 | Monego et al. | July 21, 1959 |
| 2,966,792 | Pieri | Jan. 3, 1961 |
| 3,069,893 | Kerstetter | Dec. 25, 1962 |